(12) United States Patent
Lu et al.

(10) Patent No.: US 10,919,407 B2
(45) Date of Patent: Feb. 16, 2021

(54) VEHICLE POWER SYSTEM WITH CONFIGURABLE OUTPUT CONVERTER

(71) Applicant: FORD GLOBAL TECHNOLOGIES, LLC, Dearborn, MI (US)

(72) Inventors: Xi Lu, Northville, MI (US); Ke Zou, Canton, MI (US); Krishna Prasad Bhat, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 16/168,598

(22) Filed: Oct. 23, 2018

(65) Prior Publication Data
US 2020/0122586 A1 Apr. 23, 2020

(51) Int. Cl.
*B60L 58/10* (2019.01)
*G05B 19/042* (2006.01)
*B60L 50/51* (2019.01)
*H02M 3/00* (2006.01)
*H02M 7/42* (2006.01)
*B60L 55/00* (2019.01)
*B60L 1/00* (2006.01)

(52) U.S. Cl.
CPC ............ *B60L 58/10* (2019.02); *B60L 1/006* (2013.01); *B60L 50/51* (2019.02); *B60L 55/00* (2019.02); *G05B 19/042* (2013.01); *H02M 3/00* (2013.01); *H02M 7/42* (2013.01); *B60L 2210/10* (2013.01); *B60L 2210/40* (2013.01); *B60L 2210/42* (2013.01); *G05B 2219/2639* (2013.01); *H02J 2207/20* (2020.01); *Y04S 10/126* (2013.01)

(58) Field of Classification Search
CPC ...... B60L 55/00; B60L 1/006; B60L 2210/10; B60L 2210/40; B60L 2210/42; B60L 53/00; B60L 53/16; H02J 7/0063; Y04S 10/126; Y02E 60/721
See application file for complete search history.

(56) References Cited

U.S. PATENT DOCUMENTS

| | | | |
|---|---|---|---|
| 8,682,495 B2 | 3/2014 | Carralero et al. | |
| 8,766,474 B2 | 7/2014 | Carralero et al. | |
| 9,357,319 B2 | 5/2016 | Yoon et al. | |
| 9,511,676 B2* | 12/2016 | Loftus | H02J 2207/20 |
| 9,825,470 B2 | 11/2017 | Emadi et al. | |
| 2003/0029654 A1* | 2/2003 | Shimane | B60L 3/0046 180/65.29 |
| 2012/0051100 A1* | 3/2012 | Alexander | H02M 3/1582 363/37 |
| 2014/0368041 A1 | 12/2014 | Tu et al. | |
| 2016/0190907 A1* | 6/2016 | Ayana | H02M 5/4585 363/37 |
| 2017/0099010 A1* | 4/2017 | Dziuba | H05K 7/1432 |
| 2017/0160711 A1 | 6/2017 | Wong et al. | |
| 2019/0047433 A1* | 2/2019 | Rozman | B60W 20/00 |

* cited by examiner

*Primary Examiner* — Ryan Johnson
(74) *Attorney, Agent, or Firm* — David B. Kelley; Brooks Kushman P.C.

(57) ABSTRACT

A vehicle power system includes a power converter including one or more phase leg lines and a negative rail line. The system also includes a controller that operates the power converter to flow current through some of the phase leg lines and the negative rail line to output DC power, and operates the power converter to flow current through the some of the phase leg lines and not the negative rail line to output AC power.

7 Claims, 6 Drawing Sheets

US 10,919,407 B2

VEHICLE POWER SYSTEM WITH CONFIGURABLE OUTPUT CONVERTER

TECHNICAL FIELD

This disclosure relates to vehicle power converters.

BACKGROUND

Micro grid systems usually include various types of converters. These converters enable the micro grid systems to serve different output voltages, currents, and powers to users. Typically for each application, there is a dedicated converter serving a predetermined output voltage and output power. This pre-determined voltage and power is usually not flexible and not scalable. For example, a user may want to convert a hybrid vehicle's or electric vehicle's DC high voltage to fast charge another stranded vehicle (which would require an output range between 200 $V_{DC}$ to 450 $V_{DC}$, with 100 kW power rating), and may want to charge a regular vehicle through a Level-1 charger (which would require an output of 120 $V_{AC}$, with 3.3 kW power rating). In traditional cases, two different converters would have to be specially designed and installed into the micro grid system to meet these requirements.

SUMMARY

A vehicle power system includes a traction battery, a power converter electrically connected with the traction battery and including one or more phase legs with corresponding switches, a negative rail, a phase leg line extending from each of the phase legs, and a negative rail line extending from the negative rail. The vehicle power system also includes a controller programmed to operate the switches to output at different times AC power and DC power via some of the lines.

A vehicle power system includes a power converter including one or more phase leg lines and a negative rail line, and a controller programmed to operate the power converter to flow current through some of the phase leg lines and the negative rail line to output DC power, and to operate the power converter to flow current through the some of the phase leg lines and not the negative rail line to output AC power.

A method for operating a power system of a vehicle includes activating switches of a power converter to flow current through one or more phase leg lines and a negative rail line of the power converter to output DC power, and activating switches of the power converter to flow current through the one or more phase leg lines and not the negative rail line to output AC power.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
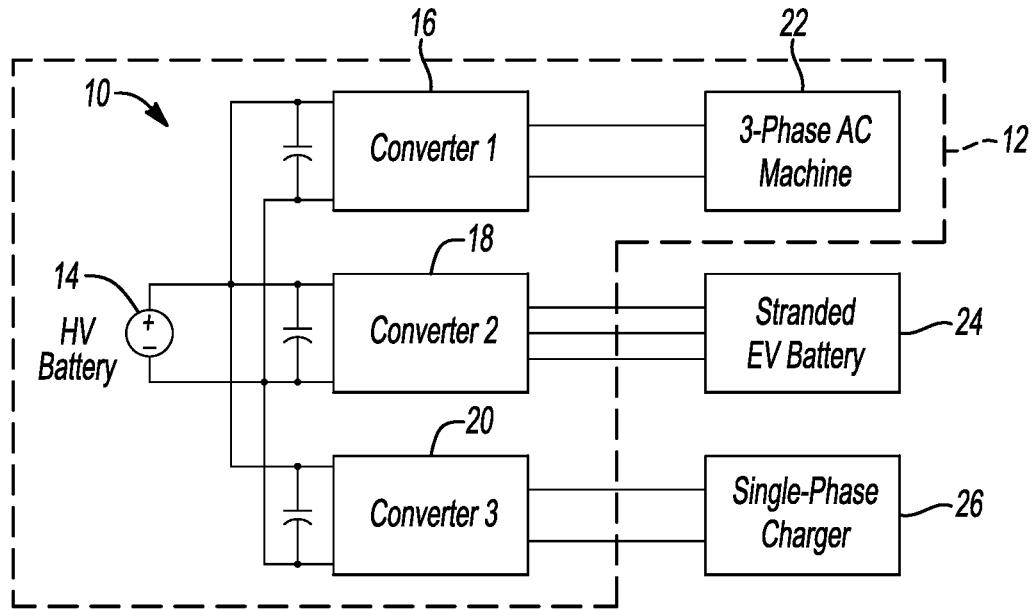
FIG. 1 is a schematic diagram of a micro-grid system with dedicated converters for each of the different types of loads.

With reference to FIG. 1, a typical micro grid system 10 of a vehicle 12 includes a traction battery 14 and multiple converters 16, 18, 20. Each of the converters 16, 18, 20 is dedicated for a specific type of load. The converter 16 is designed for a three-phase high-power load 22, such as an electric machine configured to drive wheels of the vehicle 12. The three-phase high power load 22 may also be an induction motor load, in which case it would be off-board the vehicle 12, etc. The converter 18 is designed for providing off-board power such as fast charging an electric vehicle's battery 24. And, the converter 20 is designed for generating a 120 $V_{AC}$ grid for a single-phase charger 26.

Figure 2:
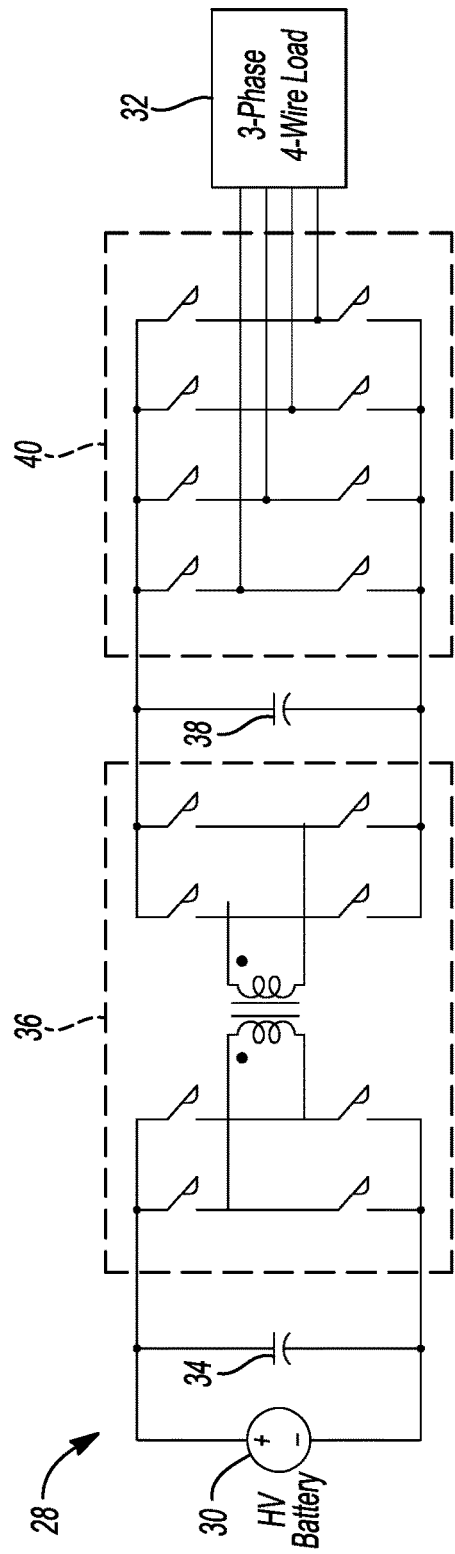
FIG. 2 is a schematic diagram of a DC-AC three-phase power converter.

With reference to FIG. 2, a typical DC-AC converter 28 for use with a traction battery 30 and multi-phase AC load 32 (and similar to the converter 16 of FIG. 1) includes a capacitor 34 in parallel with the traction battery 30, a solid-state transformer (or dual-active bridge) 36, a DC link capacitor 38, and multiple phase legs and corresponding lines 40 electrically connected with the multi-phase AC load 32. Operation of the solid-state transformer 36, which galvanically isolates the traction battery 30 from the multi-phase AC load 32, transfers power from the traction battery 30 to the DC link capacitor 38. The switches of the multiple phase legs and corresponding lines 40 can then be selectively actuated as known in the art to transfer AC power to the multi-phase AC load 32.

Micro grid applications have different load profiles, which require the associated converters to adapt accordingly. Unlike the specialized converters described above, so-called universal reconfigurable bidirectional converters are contemplated herein. These converters may be operated to handle different voltages and/or output AC power or DC power. Additionally, these converters may be used in concert with each other to augment their flexibility.

Figure 3:
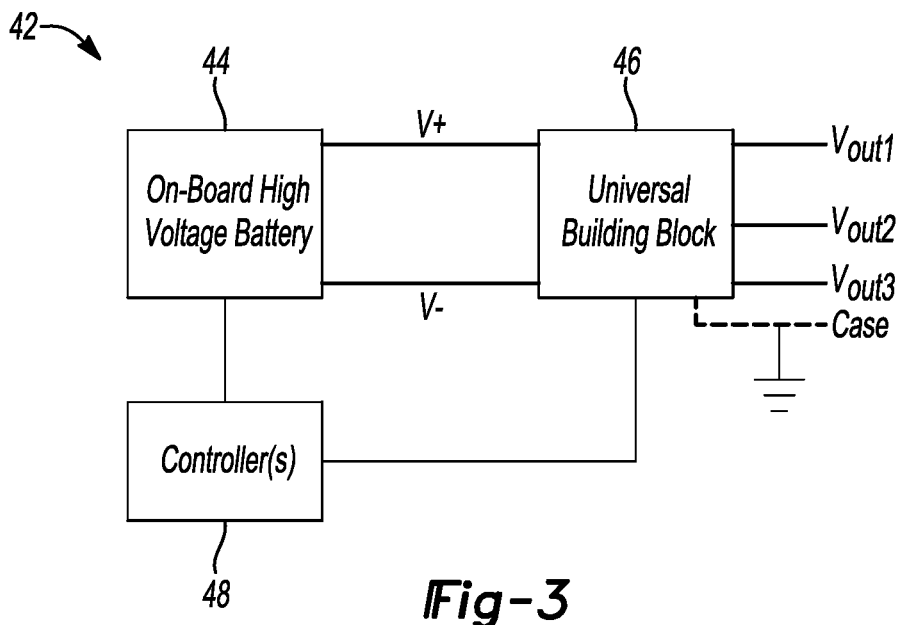
FIG. 3 is a schematic diagram of a vehicle power system including a traction battery, a universal converter building block, and a controller.

With reference to FIG. 3, a power system 42 for a vehicle includes a traction battery 44, a universal converter building block 46, and a controller 48 in communication with/exerting control over the traction battery 44 and universal converter building block 46. In this example, the universal converter building block 46 has three outputs, Vout1, Vout2, Vout3, as discussed below. The universal converter building block 46, however, may have any number of outputs (e.g., four, five, six, etc.).

Figure 4:
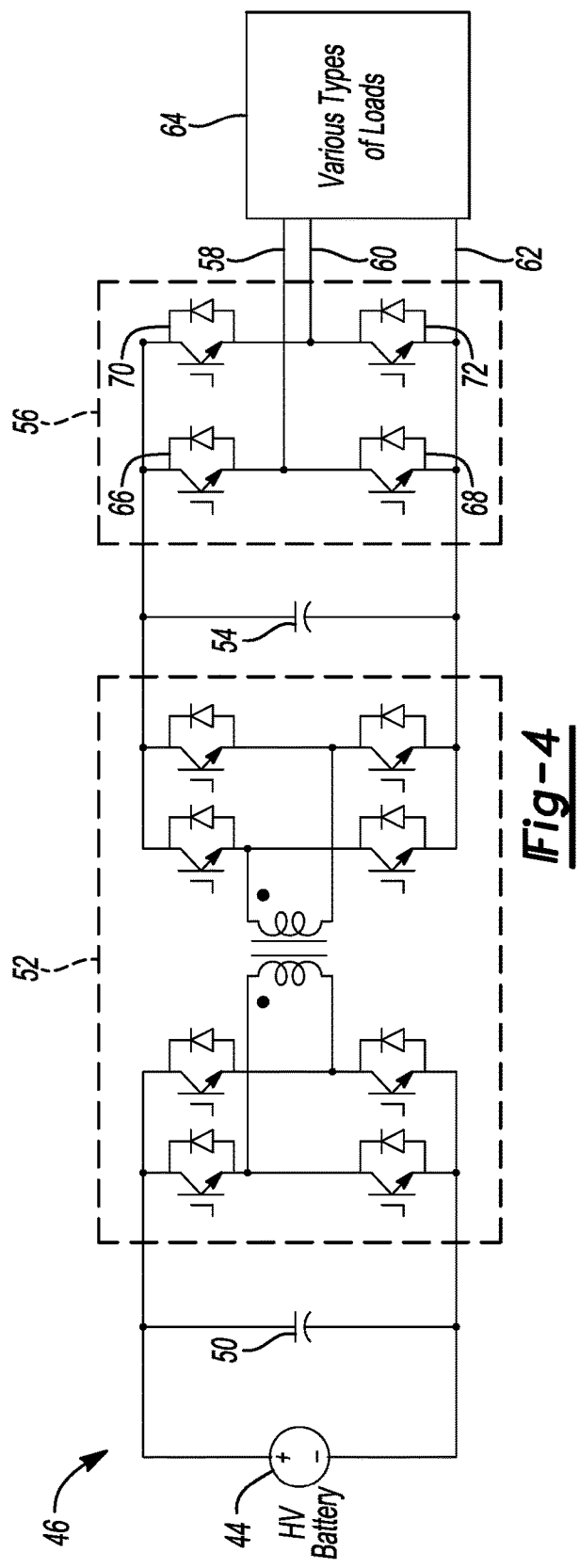
FIG. 4 is a schematic diagram of an example of the universal converter building block of FIG. 3.

With reference to FIG. 4, the universal converter building block 46 includes a capacitor 50 in parallel with the traction battery 44, a solid-state transformer 52, a DC link capacitor 54, and a multi-phase inverter 56. In this example, the universal converter building block 46 is shown with only three outputs to facilitate ease of explanation. This single-phase arrangement has two lines 58, 60 associated with the two phase legs, and a line 62 extending from a negative rail of the universal converter building block 46. The addition of the line 62 as discussed below contributes to the flexibility of this arrangement. The universal converter building block 46 can be electrically connected with various types of loads (e.g., AC loads, DC loads, etc.) via the lines 58, 60, 62.

In other examples, the universal converter building block 46 may include more than two phase legs and corresponding lines. It may, for example, include 4 phase legs and corresponding lines to service three-phase loads, etc. Topologies other than those shown are also possible. The switches can be capacitors, diodes, IGBTs, MOSFETs, etc. depending on the situation. Moreover, the left half of the transformer 52 can be a boost half-bridge, a full-bridge, or a half-bridge. The right half of the transformer 52 can be a full-bridge, a half-bridge, or an uncontrolled diode rectifier. To the extent galvanic isolation is required, the transformer 52 can have single or multiple windings on the primary side, the secondary side, or both. To the extent galvanic isolation is not required, the transformer 52 can be eliminated or simplified to a buck, boost, or buck boost converter, or any such combination. Other arrangements are also contemplated.

Each of the phase legs of the multi-phase inverter 56 includes a pair of switches. Switches 66, 68 correspond with the line 58 and switches 70, 72 correspond with the line 60. To provide a first level of DC power, the switch 66 is turned on. Current flows from the positive rail of the capacitor 54 through the switch 66 and the line 58 to the load 64, and back through the line 62 to the negative rail of the capacitor 54. When the switch 66 is turned off, the diode of the switch 68 is automatically on due to an inductor along the line 58 (not shown) not being able to change current direction instantaneously. Therefore, current flows from this inductor through the line 58 to the load 64, and through the line 62 and the diode of the switch 68. To provide a second level of DC power, the switches 66, 70 are turned on. Current flows through the switch 66 and the line 58 to the load 64 and current flows through the switch 70 and the line 60 to the load 64. Current flows back through the line 62, and so on. Similar operation can be extended to arrangements with additional phase legs and corresponding switches and lines.

To provide single phase AC power, the switches 66, 68 and 70, 72 are operated in complementary fashion. The switches 66, 72 are turned on while the switches 68, 70 are off to prompt current flow through the switch 66 and the line 58 to the load 64, and current flow from the load 64 through the line 60 and the switch 72 (to the exclusion of the line 62). Likewise, the switches 68, 70 are turned on while the switches 66, 72 are off to prompt current flow through the switch 70 and the line 60 to the load 64, and current flow from the load 64 through the line 58 and the switch 68 (to the exclusion of the line 62). Similar operation can be extended to arrangements with additional phase legs and corresponding switches and lines.

Figure 5:
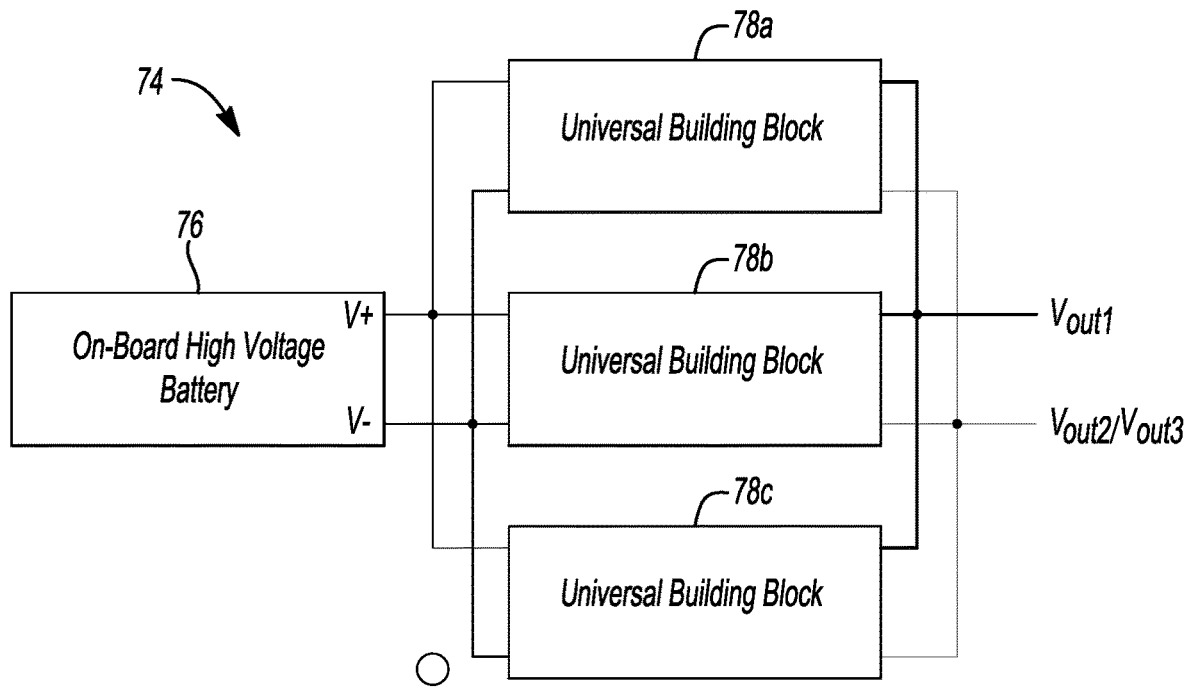
FIGS. 5 through 10 are schematic diagrams of vehicle power systems having universal converter building blocks connected in various configurations.

With reference to FIG. 5, a power system 74 for a vehicle includes a traction battery 76 and a plurality of universal converter building blocks 78a, 78b, 78c electrically connected in parallel to achieve high current or high power.

Figure 6:
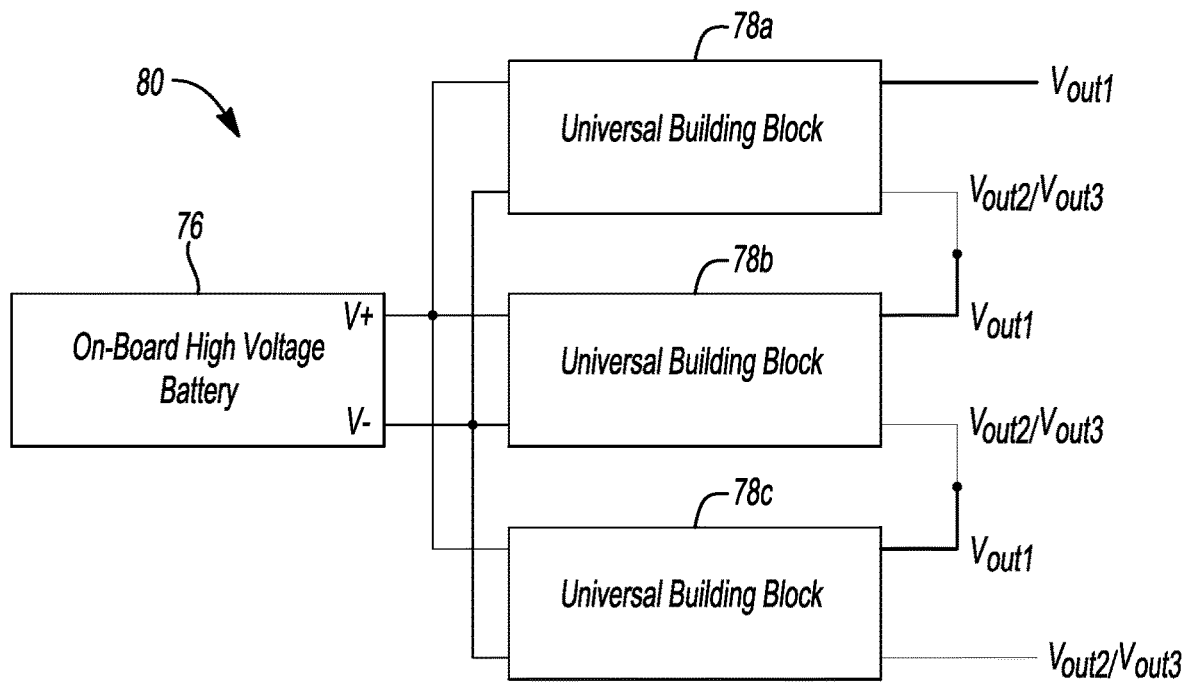

With reference to FIG. 6, a power system 80 for a vehicle includes the traction battery 76 and the plurality of universal converter building blocks 78a, 78b, 78c electrically connected in series to achieve high voltage.

Figure 7:
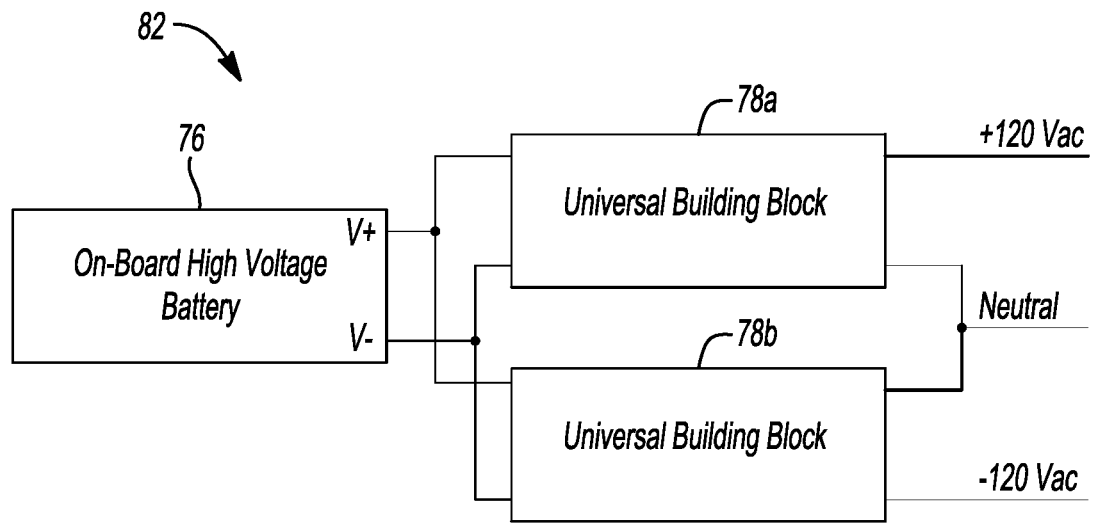

With reference to FIG. 7, a power system 82 for a vehicle includes the traction battery 76 and the plurality of universal converter building blocks 78a, 78b electrically connected to output different voltages, e.g., 240 $V_{AC}$ split phase.

Figure 8:
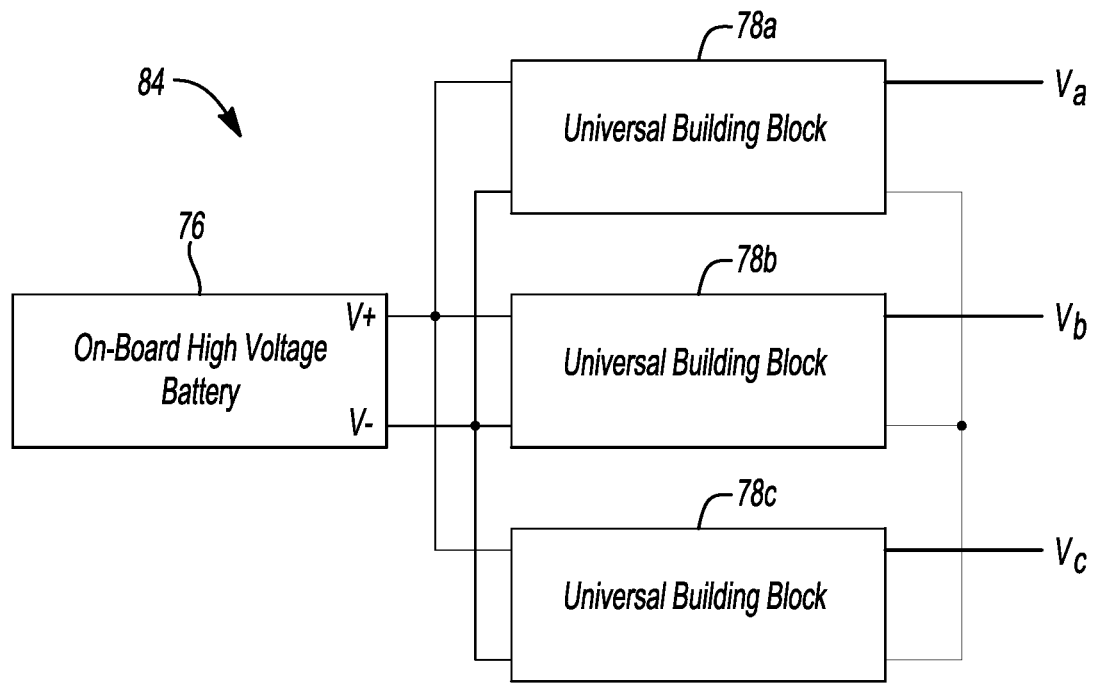

With reference to FIG. 8, a power system 84 for a vehicle includes the traction battery 76 and the plurality of universal converter building blocks 78a, 78b electrically connected with phase shift to form a multi-phase system, e.g., 3-phase delta, 3-phase Y.

Figure 9:
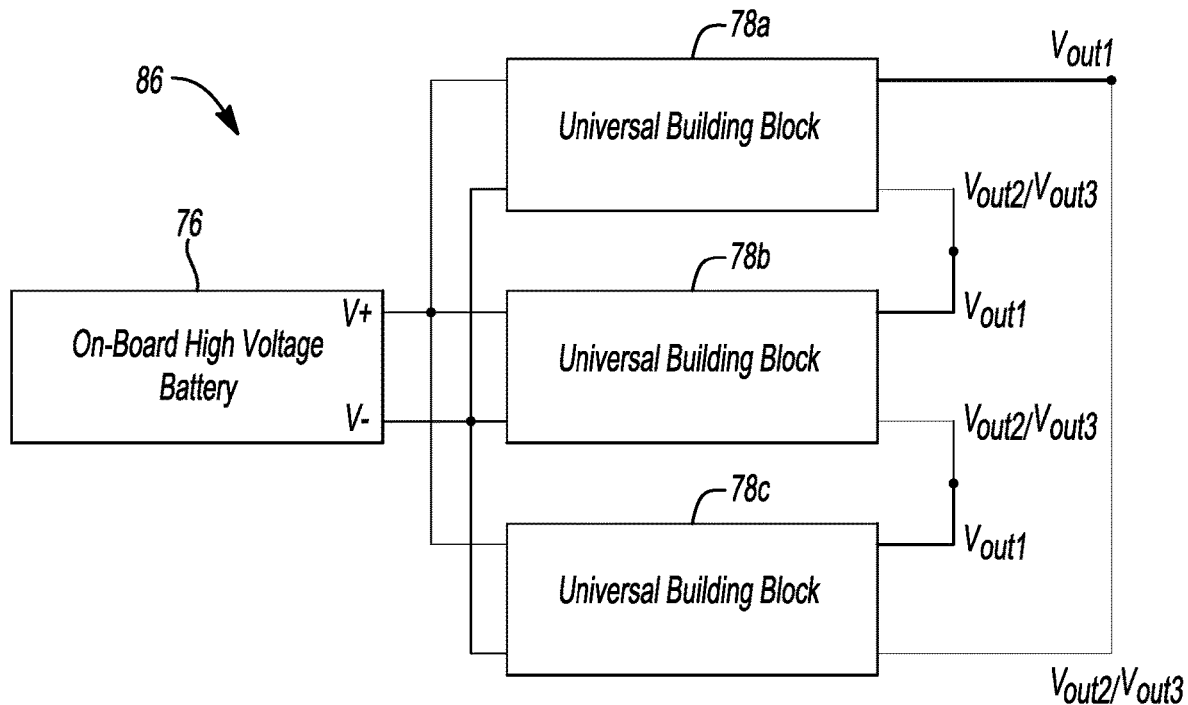

With reference to FIG. 9, a power system 86 for a vehicle includes the traction battery 76 and the plurality of universal converter building blocks 78a, 78b, 78c electrically connected with phase shift to form a 3-phase Δ system.

The examples of FIGS. 5 through 9 are shown with two or three converters. Any number, however, may be used: four converters, five converters, etc. Regardless of the number of phase legs for each converter, certain of these arrangement may only work when the converters are operated in single phase mode.

Figure 10:
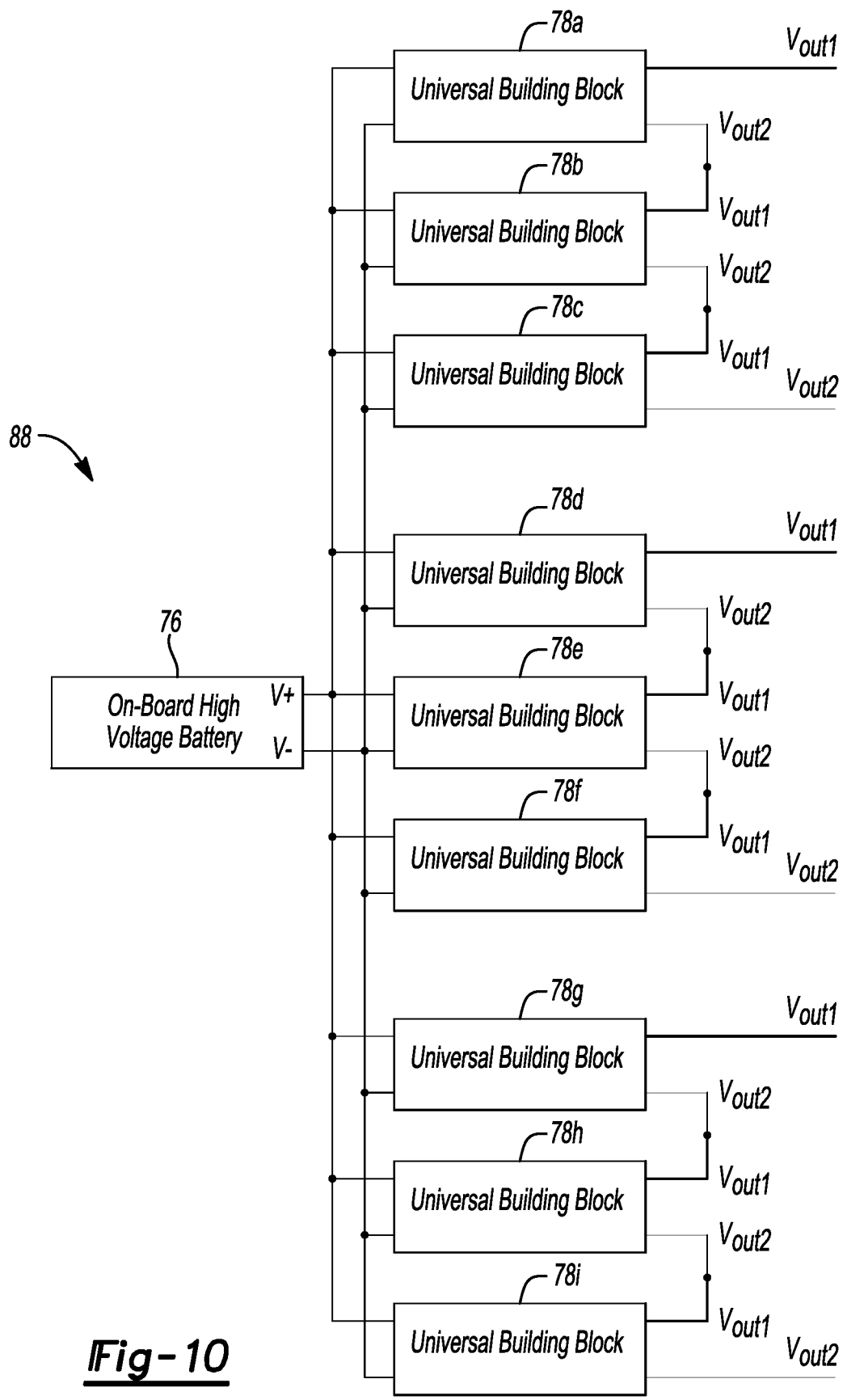

With reference to FIG. 10, a power system 88 for a vehicle includes the traction battery 76 and the plurality of universal converter building blocks 78a through 78i electrically connected in series and phase shifted together to achieve 3-phase 480 $V_{AC}$ output.

Figure 11:
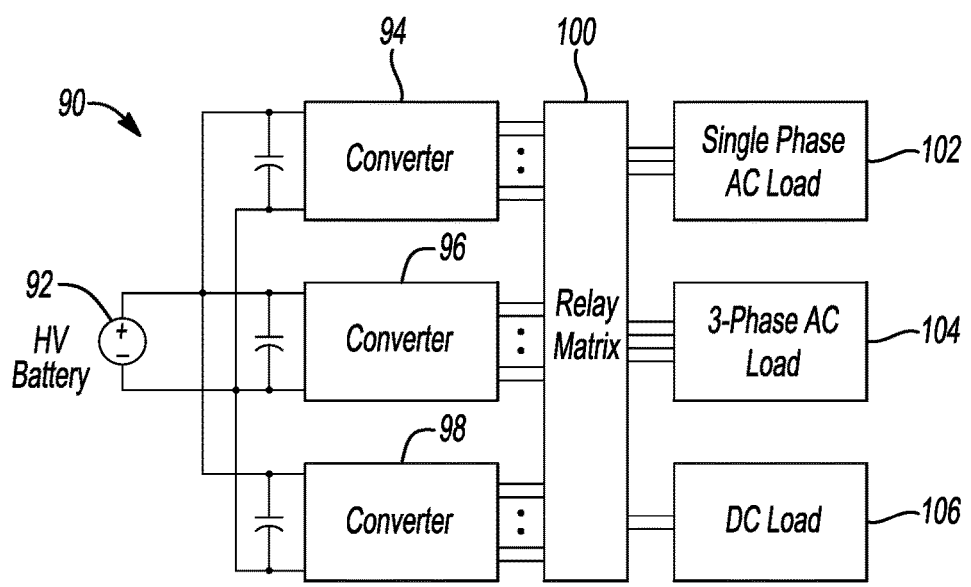
FIG. 11 is a schematic diagram of a micro-grid system with converters arranged to provide power to different types of loads.

With reference to FIG. 11, a micro grid system 90 includes a traction battery 92, multiple converters 94, 96, 98 of the types contemplated herein, and a relay matrix 100. The relay matrix 100 provides access to a plurality of loads: single phase AC load 102, 3-phase AC load 104, and DC load 106. In this example, the multiple converters 94, 96, 98 can have the same architecture but be controlled differently such that the converter 94 outputs single phase AC power for the single phase AC load 102, the converter 96 outputs 3-phase AC power for the 3-phase AC load 104, and the converter 98 outputs DC power for the DC load 106, all transferred via the relay matrix 100. Another scenario can be that the converters 94, 96, and 98 can be paralleled to increase the output power when a high power 3-phase AC load is connected. The relay matrix 100 would be able to parallel output of the 3 converters together to implement this.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising
    a traction battery;
    a plurality of power converters each electrically connected with the traction battery and including two or more phase legs with corresponding switches, a negative rail, a phase leg line extending from each of the phase legs, and a negative rail line extending from the negative rail; and
    a controller programmed to operate the switches to output at different times AC power and DC power via some of the lines, wherein the plurality of power converters is arranged to provide three-phase power or split-phase power.

2. The vehicle power system of claim 1, wherein current flows through the negative rail line of at least one of the plurality of power converters responsive to the at least one of the plurality of power converters outputting DC power.

3. The vehicle power system of claim 1, wherein current does not flow through the negative rail line of at least one of the plurality of the power converters responsive to the at least one of the plurality of power converters outputting AC power.

4. A vehicle power system comprising:
    a plurality of power converters each including two or more phase leg lines and a negative rail line; and
    a controller programmed to operate at least one of the plurality of power converters to flow current through some of the phase leg lines and the negative rail line to output DC power, and to operate the at least one of the plurality of power converters to flow current through the some of the phase leg lines and not the negative rail line to output AC power, wherein the plurality of power converters is arranged in parallel to achieve high power or in series to achieve high voltage.

5. The vehicle power system of claim 4, wherein the plurality of power converters is arranged in parallel.

6. The vehicle power system of claim 4, wherein the plurality of power converters is arranged in series.

7. A method for operating a power system of a vehicle, comprising:
    activating switches of a plurality of power converters to flow current through two or more phase leg lines and a negative rail line of the power converters to output DC power;
    activating switches of the plurality of power converters to flow current through the two or more phase leg lines and not the negative rail line to output AC power; and
    activating switches of the plurality of power converters to output three-phase or split-phase power.

\* \* \* \* \*